United States Patent [19]

Goretta et al.

[11] 4,363,752

[45] Dec. 14, 1982

[54] CATALYST OF ACTIVATED COPPER-ZINC ALLOY AND ITS USE IN HYDRATING ACRYLONITRILE

[75] Inventors: Louis A. Goretta, Nappervills; Frederick J. Sibert, Chicago, both of Ill.

[73] Assignee: Nalco Chemical Company, Oak Brook, Ill.

[21] Appl. No.: 271,285

[22] Filed: Jun. 8, 1981

[51] Int. Cl.$^3$ .................. B01J 23/06; B01J 23/72; C07C 102/08

[52] U.S. Cl. .................. 252/475; 252/477 Q; 564/127

[58] Field of Search .................. 252/475, 477 Q; 564/127

[56] References Cited

U.S. PATENT DOCUMENTS

| | | |
|---|---|---|
| 3,597,481 | 8/1971 | Tefertiller et al. . |
| 3,631,104 | 12/1971 | Habermann et al. . |
| 3,642,643 | 2/1972 | Habermann et al. . |
| 3,642,894 | 2/1972 | Habermann et al. . |
| 3,755,100 | 8/1973 | Epple . |
| 3,764,494 | 10/1973 | Allain . |
| 3,767,706 | 10/1973 | Habermann et al. . |
| 3,776,957 | 12/1973 | Newkirk . |
| 3,789,074 | 1/1974 | Seale et al. . |
| 3,791,991 | 2/1974 | Seale et al. . |
| 3,795,629 | 3/1974 | Kewkirk et al. . |
| 3,809,658 | 5/1974 | Csürös et al. .................. 252/477 Q |
| 3,846,495 | 11/1974 | Svarz . |
| 3,894,084 | 7/1975 | Werges et al. . |
| 3,894,962 | 7/1975 | Allain et al. . |
| 3,900,516 | 8/1975 | Werges . |
| 3,900,517 | 8/1975 | Svarz . |
| 3,901,943 | 8/1975 | Werges . |
| 3,920,740 | 11/1975 | Svarz et al. . |
| 3,928,440 | 12/1975 | Allain et al. . |
| 3,928,441 | 12/1975 | Hunter et al. . |
| 3,928,442 | 12/1975 | Seale et al. . |
| 3,928,443 | 12/1975 | Allain et al. . |
| 3,929,421 | 12/1975 | Werges . |
| 3,929,673 | 12/1975 | Hoffman et al. . |
| 3,932,506 | 1/1976 | Hunter et al. . |
| 3,941,720 | 3/1976 | Hoffmann et al. .................. 252/463 |
| 3,943,171 | 3/1976 | Hoffman et al. . |
| 3,953,367 | 4/1976 | Hoffman et al. . |
| 3,989,754 | 11/1976 | Hurlock . |
| 4,000,195 | 12/1976 | Svarz et al. . |
| 4,010,142 | 3/1977 | Hurlock et al. . |
| 4,014,820 | 3/1977 | Svarz et al. . |
| 4,056,565 | 11/1977 | Matsuda .................. 564/127 |
| 4,067,902 | 1/1978 | Werges . |
| 4,169,107 | 9/1979 | Asano et al. .................. 564/127 |
| 4,177,210 | 12/1979 | Vanderkooi et al. .................. 546/127 |

FOREIGN PATENT DOCUMENTS

| | | |
|---|---|---|
| 899380 | 5/1972 | Canada . |
| 2036126 | 2/1971 | Fed. Rep. of Germany . |
| 2164185 | 6/1972 | Fed. Rep. of Germany . |
| 43-695205 | 3/1968 | Japan . |

*Primary Examiner*—W. J. Shine
*Attorney, Agent, or Firm*—Hill, Van Santen, Steadman, Chiara & Simpson

[57] ABSTRACT

A particulate alloy of 30% copper and 70% zinc is activated with alkali metal hydroxide to produce a catalyst which is useful for the catalytic hydrolysis of acrylonitrile to acrylamide under liquid phase conditions.

37 Claims, No Drawings

CATALYST OF ACTIVATED COPPER-ZINC ALLOY AND ITS USE IN HYDRATING ACRYLONITRILE

BACKGROUND OF THE INVENTION

In the art of catalytically hydrolyzing acrylonitrile with water to acrylamide, various copper and copper containing catalysts have heretofore been proposed, such as mixtures of copper oxide with other metal oxides, reduced copper oxides/metal oxide mixtures, copper and copper/metal mixtures, Raney copper, and the like (see, for example, U.S. Pat. Nos. 3,597,481; 3,631,104; 3,642,894; 3,767,707; and 3,642,643; German Pat. No. 2,036,126; German D.O.S. 2,164,185; Canadian Pat. No. 899,380; and Japanese Publication 69/5205).

One of us is a coinventor in U.S. Pat. No. 3,920,740 which relates to an improved process for making acrylamide from a composition of acrylonitrile and water utilizing an improved Raney copper catalyst which contains from about 2 to 45 weight percent of aluminum on a 100 weight percent total weight basis which catalyst is preferably prepared under low temperature and/or slow caustic addition conditions from a copper/aluminum alloy. The hydrolysis process can be practiced continuously. See also U.S. Pat. No. 4,000,195.

Similarly, one of us is named as a coinventor in U.S. Pat. No. 3,894,084 which relates to a process for catalytically hydrolyzing acrylonitrile to acrylamide in a reactor containing water and a copper catalyst suspended therein with agitation. Acrylonitrile is added incrementally to the reactor after which it is held for an additional period in the reactor. Thereafter, agitation is stopped, the catalyst falls to the bottom of the reactor, and an acrylamide solution is decanted off the top of the reactor.

So far as in known, copper/zinc alloys have never previously been found to be activatable with sodium hydroxide for the preparation of catalysts, and, likewise so far as is known, such a catalyst so prepared has never previously been utilized for hydrating acrylonitrile to acrylamide.

SUMMARY OF THE INVENTION

By the present invention, there is provided a new and efficient catalyst and processes for preparing such catalyst with alkali metal hydroxide from a copper/zinc alloy containing about 30 weight percent copper and about 70 weight percent zinc.

In another aspect of the present invention the catalyst so prepared is employed in a new and efficient process for catalytically hydrolyzing acrylonitrile to acrylamide. The process is practicable batch wise or continuously under liquid phase conditions.

An object of the present invention is to provide a new copper-containing catalyst from a copper/zinc alloy together with methods for its preparation from such alloy using an alkali metal hydroxide.

Another object of the present invention is to provide an improved process for hydrolyzing acrylonitrile to acrylamide under liquid phase condition using a copper catalyst prepared by activation of a copper/zinc alloy.

Other and further objects, purposes, advantages, utilities, features, aims, and the like will be apparent to those skilled in the art from a reading of the present specification.

DETAILED DESCRIPTION

We have discovered that a copper-zinc alloy containing about 30 weight percent copper and about 70 weight percent zinc can be activated with aqueous alkali metal hydroxide to produce a catalyst which appears to be well suited for hydrating acrylonitrile to acrylamide.

Activation is accomplished, in accord with the present invention by contacting such aqueous alkali metal hydroxide, with such alloy in a contacting zone. The alloy is preferably in the form of particles having a size ranging from about 0.0005 to 0.03 inches although larger and smaller size particles can be employed as those skilled in the art will readily appreciate. The contacting is continued for a time sufficient to remove from such starting alloy at least about 50 weight percent of the zinc initially present therein (based on total starting alloy weight).

During the contacting the total amount of alkali metal hydroxide present in the contacting zone ranges from about 1.0 to 3.0 times the number of moles of zinc initially present in said alloy. During the contacting, the alloy particles are suspended by agitation in the aqueous alkali metal hydroxide. During the contacting, the temperature of such aqueous alkali metal hydroxide is maintained in the range from about 15° C. to reflux. Preferably, at least about 70 weight percent of said zinc initially present in said alloy on a 100 weight percent total alloy basis is removed. After such contacting is completed, the product catalyst particles are washed with water until a wash water pH preferably not above about 7 or 8 is achieved. The wash water is preferably deionized or distilled water. The resulting so washed catalyst is conveniently stored under water until used.

Preferably, before such contacting is commenced, the alloy is suspended in water with agitation and the alkali metal hydroxide is added to such suspension gradually over a time period which is not greater than the total time of such contacting. More preferably, the initial weight ratio of said alloy to said water ranges from about 0.001 to 0.35 inches.

Preferably, such contacting is conducted in the presence of at least one dissolved additive compound which is an hydroxylated hydrocarbon compound. Suitable hydroxylated hydrocarbon compounds are characterized by having at least two carbon atoms per molecule and by having at least two groups per molecule each of which is independently selected from the class consisting of hydroxyl, carboxyl, alkdehyde, alkali metal carboxylate, and esterified carboxylate, at least one of said groups being hydroxyl. Preferably, such a hydroxylated hydrocarbon compound has at least one of said groups being hydroxyl. Preferably, such a hydroxylated hydrocarbon compound has at least three carbon atoms per molecule each of which is independently selected from the class consisting of hydroxyl, carboxyl, aldehyde, alkali metal carboxylate and esterified carboxylate, at least one of said groups being hydroxyl.

One preferred group of hydroxylated hydrocarbon compounds suitable for use in the present invention comprises polyhydroxylated aliphatic carboxylic acids. One class of such acids suitable for use in the present invention is characterized by the formula:

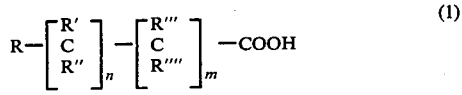

where:
R, R', R", R'" and R"" are each independently H, lower alkyl, —OH, or —COOH provided that at least one of R, R', R", R'" and R"" is hydroxyl and that at least one other of such R, R', R", R'" and R"" groups is either carboxyl or hydroxyl,
n is an integer of from 2 through 8 (4 through 8 being preferred),
m is an integer of from 0 through 4.

It will be readily appreciated by those skilled in the art that one can employ, in place of, or in addition to, those compounds of formula (1), carboxylate salts (such as alkali metal salts and ammonium salts) and carboxylate esters (such as lactones and esters with lower aliphatic alchols) which will, in alkaline water solution, form the same anions as do the compounds of formula (1).

Examples of particular compounds within the scope of formula (1) include: gluconic acid, glucaric acid, saccharinic acid, and the like.

One more preferred class of hydroxylated hydrocarbon compounds within the scope of formula (1) above is characterized by the formula:

where:
R is selected from the group consisting of —CH$_3$, —CH$_2$OH, —COOH, —CHO, —H, and
n is an integer of from 1 through 5.

Examples of particular compounds within the scope of formula (2) include gluconic acid, glucaric acid, and the like.

Examples of compounds suitable for use as additives during contacting in accord with the teachings of this invention which are similar to compounds within the scope of formula (1) or for formula (2) include alkali metal salts (sodium being presently preferred) of gluconic acid, tartaric acid, or citric acid, lactones, such as gluconolactone, and the like.

Another class of hydroxylated hydrocarbon compounds includes aliphatic polyhydroxylated compounds with at least three carbon atoms and at least three hydroxyl groups per molecule. Such compounds can include as many as 12 to 15 carbon atoms in a given molecule.

A more preferred class of such polyhydroxylated hydrocarbon compounds suitable for use with caustic in activating copper catalysts for use in the practice of the present invention is characterized by the formula:

where n is an integer of from 2 through 8.

Examples of formula (3) compounds include sorbitol, mannitol, and the like.

Another class of hydroxylated hydrocarbon compounds suitable for use in the practice of the present invention for activating copper catalysts with caustic includes saccharides (including mono, di, and polysaccharides). Examples include glucose, sucrose, corn starch, arabinose, and the like.

One preferred class of hydroxylated hydrocarbon compounds comprises aromatic compounds containing at least two hydroxyl groups (preferably ring bonded) and one aromatic ring. A carboxyl or aldehyde group may be present. One preferred example is gallic acid.

Preferred hydroxylated hydrocarbon compounds are substantially completely water soluble at the concentrations employed in the usual practice of this invention.

Presently most preferred hydroxylated hydrocarbon compounds include gluconic acid (and compounds which produce the gluconate ion in water solution, such as sodium gluconate, glucono-S-lactone, and the like) sorbitol, and glucose (dextrose).

Those skilled in the art will appreciate that a catalyst prepared as taught herein may undergo preparation by procedures known to the prior art as desired before being utilized in a hydrolysis process as taught herein. Thus, for example, before or during a contacting operation with alkali metal hydroxide in accordance with the teachings of this invention, the particles may be further brought into contact with water having dissolved therein such an additive.

The amount of such additive dissolved in water and contacted with particles can range widely, but, in general, quantities of from greater than 0 to 30 weight percent (total solution basis) are employed. The time of contacting with such an additive can vary widely and is apparently not critical, although catalyst activity is enhanced apparently through contact with such an additive solution preferably during the contacting with caustic. Quantities of from 0.01 to 5 weight percent are preferred although larger amounts of a material such as ethylene glycol may be employed.

After being contacted with such an aqueous solution of additive, the resulting particles may, if desired, be finally washed with water to a pH in the range indicated, following which the particles may be stored as above indicated.

Broadly, a starting group of copper/zinc alloy particles ranges in size from about 0.0005 to 0.5 inch. Preferably such particles have not previously been activated with the base for use in catalysis, and preferably such particles have preferably had substantially no previous history of exposure to oxygen.

Preferably, alloy particles being so contacted in accord with the present invention are maintained under water (e.g., in contact with water) before such contacting so as to minimize exposure to air (oxygen). Preferably, all waters used in the practice of this invention are either distilled water or dionized water, especially the waters used for particle storage before or after a contacting operation in accord with this invention.

The temperature in the reaction zone during the time of contacting of alloy particles with a solution of alkali metal hydroxide (preferably containing also an additive as hereinabove described) can be as above indicated. A presently preferred contacting temperature ranges from about 15° to 55° C.

During the contacting a reaction occurs, and hydrogen is evolved, apparently as the zinc in the starting alloy reacts with the base. The actual reaction rate appears to be dependent upon many variables, including time, temperature, pressure, alloy particle size, presence of alkali metal hydroxide, and the like, as those skilled in the art will appreciate. The amount of hydrogen gas evolved during a contacting does not appear to be always related to, or correlatable with, the concentration of dissolved alkali metal hydroxide (or amount of additive compound(s) optionally but preferably present). Conveniently, the hydrogen gas produced is vented more or less at the rate generated from the reaction zone.

It is preferred to conduct the activation operation under inert conditions, such as under a blanket of nitrogen gas or a gas of the helium family primarily to avoid forming explosive mixtures of hydrogen and oxygen.

At the end of a contacting operation in accord with the teachings of this invention, the resulting particles remaining are preferably washed with water to a pH which is not above 8, as indicated above. The product catalyst is then removed from the reaction zone and wet screened, preferably, to separate bins.

The product catalyst is conveniently stored under water, as in drums, prior to charging to a reator for use in the practice of the process of the invention because keeping the catalyst under water prevents oxidation by air which occurs rapidly if the catalyst is allowed to have oxygen exposure.

In general, the total time of contacting between alkali metal hydroxide and copper/zinc alloy (whether or not an additive compound is present) can vary widely but is typically in the range from about 10 to 200 hours. The exact operative function of an additive compound is unknown during activation, but catalyst activity appears to be improved somewhat for purposes of acrylonitrile hydration to acrylamide when an additive compound is present. It is theorized (and there is no intent herein to be bound by theory) that an additive compound may function in part at least to keep or aid in keeping zinc in aqueous solution or dispersion, thereby enhancing the removing of zinc from starting alloy and thereby aiding in catalyst activation.

Preferably, the total number of moles of alkali metal hydroxide in the medium during the contacting period is at least about 0.5 times the number of moles of zinc additionally present in the alloy particles. The total weight of water initially in this medium at the beginning of contacting, plus water added during contacting, preferably ranges from about 100 to 1.5 times the total weight of the alkali metal hydroxide charged to the medium. A present particularly preferred aqueous solution contains about 20 weight percent sodium hydroxide which is maintained at a presently preferred operating temperature of about 45° C.

The alkali metal hydroxide solution added can contain from about 1 to 40 weight percent dissolved hydroxide, though solutions of alkali metal hydroxide having higher caustic contents (up to solution saturation) may be employed as starting leaching solution for use in preparation (activation or actuation) of a catalyst of the present invention. Alkali metal hydroxide may also be added as solid pellets or flakes to an aqueous medium, although handling of alkali metal hydroxide as a solution is generally preferred on a commercial scale for reasons of safety and economy. During such an addition, an alkali metal hydroxide composition reacts with and dissolves the zinc in the starting alloy in amounts such that the amount of zinc removed from the resulting so leached solid particulate catalyst is more preferably at least about 70 weight percent, on a 100 weight percent total alloy basis.

The total time of contacting of caustic solution with alloy particles is typically and preferably accomplished in a time interval ranging from about 10 to 200 hours with preferred time intervals falling in the range of from about 20 to 150 hours, but, as those skilled in the art will appreciate, if desired, longer and shorter contacting times can be employed. Fresh or starting alkali metal hydroxide solution is preferably added gradually to the particles being activated over the duration of the time period. The starting alloy particles, if desired, can be initially immersed in water before being contacted with alkali metal hydroxide solution.

At the end of the contacting period with the alloy particles being suspended with agitation the hydroxide addition is suspended, agitation is terminated and the catalyst particles are thus caused to fall to the bottom of the reaction zone after which the water with the alkali metal hydroxide contained therein is removed and separated from the product particles. The product particles are then washed in water until a wash water pH preferably not above about 8.0 is achieved. The wash water is preferably de-ionized or distilled. More preferably the catalyst particles are washed until wash water pH falls in the range of from about 7.0 to 7.5.

The product catalyst thus prepared can be removed from the reaction or activation zone. Preferably the catalyst is wet screened to separate fines, the product catalyst can be stored conveniently under water in a drum or the like. Keeping the catalyst under water tends to prevent oxidation thereof as by air which tends to occur rapidly if the catalyst is allowed to have air or oxygen exposure.

In one preferred catalyst activation process for preparing a catalyst suitable for catalytically hydrolyzing acrylonitrile to acrylamide, one follows the steps of sequentially:

(A) suspending in water with agitation in a reaction zone an alloy comprising on a 100 weight percent total alloy basis about 30 weight percent copper and about 70 weight percent zinc, said alloy being in the form particles having a size ranging from about 0.005 to 0.03 inch in average diameter to produce an initial weight ratio of said alloy particles to said water in the range from about 0.01 to 0.35, (B) adding alkali metal hydroxide to such so suspended alloy particles while maintaining the bulk temperature of said water in the range from about 15.0° C. to reflux, thereby to contact said particles with said alkali metal hydroxide under liquid phase conditions, the total quantity of alkali metal hydroxide so added to such suspension ranging from about 1.0 to 3.0 times the number of moles of zinc initially present in said alloy, the time of such adding ranging from about 10 to 200 hours and the total time of such contacting ranging from about 10 to 200 hours, the interrelationship between said temperature and said total contacting time being such that at least about 50 weight percent of the zinc initially present in said alloy is removed therefrom on a 100 weight percent total alloy basis, and (C) washing with water said catalyst particles until a wash water pH not above about 8 is achieved.

In such preferred preparation process the total concentration of dissolved alkali metal hydroxide present during the adding and the contacting in such suspension is preferably not greater than about 50 weight percent (based upon total weight of water plus dissolved alkali metal hydroxide). Such adding and such contacting is preferably conducted in the presence of at least one dissolved additive compounds as hereinabove described. Preferably, the total contacting time is longer than the time of adding and the total contacting time is such that at least about 70 weight percent of the zinc initially present in the alloy on a 100 weight percent total initial alloy basis is removed. Preferably the product catalyst particles are washed to a pH not above about 7.5. Preferably the total contacting time is at least about 50 hours.

Preferably, the total weight of water initially in this medium at the beginning of contacting, plus water added during contacting, ranges from about 1.0 to 5.0 times the total weight of the alkali metal hydroxide charged to the medium. A present particularly preferred aqueous solution contains about 20 weight percent sodium hydroxide which is maintained at a presently particularly preferred contacting temperature of about 45° C.

The alkali metal hydroxide solution added can contain from about 1 to 40 weight percent dissolved alkali metal hydroxide, though solutions of alkali metal hydroxide having higher caustic contents (up to solution saturation) or lower (down to pH values as low as about 8) may be employed as leaching solutions for use in preparation (activation or actuation) of a catalyst of the present invention. Alkali metal hydroxide may also be added as solid pellets or flakes to an aqueous medium, although handling of alkali metal hydroxide as a solution is generally preferred on a commercial scale for reasons of safety and economy.

A total preferred time of contacting of alkali metal hydroxide solution with alloy particles is typically and preferably accomplished in a time interval ranging from about 24 to 100 hours.

Fresh or starting alkali metal hydroxide solution is preferably added gradualy to the aqueous medium being used for contacting particles being activated over the duration of the time period. The starting alloy particles, if desired, can be initially immersed in deionized or distilled water before being contacted with alkali metal hydroxide solution.

At the end of the contacting period with the alloy particles preferably being suspended with agitation preferably the hydroxide addition is stopped (if allowed to proceed for the full contacting period), the agitation is terminated, and the catalyst particles are thus caused to fall to the bottom of the reaction zone after which the water with the alkali metal hydroxide contained therein is readily removed and separated from the product particles. The product particles are then washed in water as indicated.

The exact composition and structure of catalysts produced by the procedure above described is not now known.

It is in general easier to form copper/zinc alloy into particles having diameters ranging from about 0.002 to 0.50 inch than it is to form such an alloy into particle having diameter in the range of from about 0.02 to 0.50 inch. Therefore, it is preferred to prepare and use a catalyst of the present invention for suspension bed reaction purposes.

When it is desired to utilize this catalyst for the conversion of acrylonitrile to acrylamide with water known liquid phase hydrolysis conditions for acrylonitrile may be employed, if desired, except that a catalyst of this invention may be employed in place of a prior art catalyst. Typically, a starting composition comprises from about 25 to 95 weight percent water with the balance up to 100 weight percent thereof being acrylonitrile. Preferably, such a composition contains from about 30 to 40 weight percent acrylonitrile on a 100 weight percent total basis. At such preferred concentrations, the acrylonitrile and water are not completely miscible. The hydrolysis process is conducted under liquid phase conditions using temperatures in the range from about 65° to 150° C. with temperatures of from about 70° to 120° C. being presently preferred.

The hydrolysis process involves contacting such a composition with an activated copper/zinc alloy catalyst of the present invention, such catalyst having been prepared as herein described.

The hydration reaction proceeds even when the amount of catalyst employed is very slight. For example, addition of such catalyst in an amount as low as about 0.01 gram per mole of acrylonitrile is sufficient to make the acrylonitrile hyrolysis reaction proceed. The greater the amount of catalyst used, the faster the reaction proceeds, other variables being constant, in general, thus permitting an increase in the amount of acrylamide produced. Consequently, the amount of catalyst employed per mole of starting acrylonitrile initially employed preferably ranges from about 0.01 to 100 grams.

The hydrolysis reaction can proceed using a mixture of acrylonitrile and water using a suspension bed, or a fixed bed, of catalyst or combination thereof. Two or more reactors may be connected in series. The reaction liquid and the catalyst particles, as when a suspension bed system is employed, may be counter-currently moved to effect and enhance reaction.

The hydrolysis process may be practiced under atmospheric pressures or slightly above, the latter being presently preferred, but the process may be practiced at desired superatmospheric and subatmospheric pressures, depending upon equipment consideration. Inert gas atmospheres such as provided by nitrogen, steam, or the like, may be optionally employed to maximize the conversion of acrylonitrile to acrylamide at given process conditions. Batch processing may be used, but continuous processing is presently preferred for commercial purposes.

The hydrolysis process of this invention utilizing a suspension bed catalyst is presently preferably practiced using catalyst particles having average particle diameters in the range of from about 0.002 to 0.100 inch. Similarly, when the hydrolysis process is practiced using the catalyst in the form of a fixed bed, it is convenient and preferred to use catalyst particles having average particle diameters in the range from about 0.02 to 0.50 inch.

One preferred process of the present invention hydrolyzing acrylonitrile to acrylamide involves the steps of sequentially:

(A) suspending in water contained in a reaction zone with agitation copper catalyst particles prepared by the process of this invention and having a particle size ranging from about 0.005 to 0.03 inches in average diameter, the weight ratio of said water to said catalyst ranging from about 2.0 to 20.0, (B) adding to said water while said catalyst particles are so suspended therein and while maintaining at an initial water temperature ranging from about 80° to 150° C. acrylonitrile with agitation, the total amount of acrylonitrile so added being such that the weight ratio of said water to total added acrylonitrile ranges from about 93.5:6.5 to 25:75, (C) maintaining the resulting mixture in said reaction zone with agitation at a water temperature ranging from about 80° to 150° C. until a total conversion of said acrylonitrile to produce acrylamide of at least about 50% is achieved, (D) terminating said agitation in said reaction zone, thereby causing said catalyst particles to fall to the bottom of said reaction zone, (E) removing at least a major portion of said acrylamide product solution from said reaction zone while retaining substantially all of said catalyst particles in said reaction zone, (F) charging water to said reaction zone in an amount sufficient to bring the weight ratio of said water to said catalyst into the range from about 2.0 to 20.0, and (G) repeating sequentially said steps (A) through (F) at least once.

In such preferred process for hydrolyzing, the water temperature preferably ranges from about 85° to 115° C. Preferably, the maintaining is continued until the total conversion of said acrylonitrile to produced acrylamide is at least about 65%.

EMBODIMENTS

The present invention is further illustrated by reference to the following Examples. Those skilled in the art will appreciate that other and further embodiments are obvious and within the spirit and scope of this invention from the teachings of these present Examples taken with the accompanying specification.

EXAMPLES 1-7

Activation of Alloy to Copper Catalyst

A series of copper/zinc binary homogeneous alloys are prepared wherein each alloy is in the form of particles ranging from about 0.001 to 0.5 inch in average diameter. A measured quantity of each alloy, in each activation procedure, is introduced into a stirrable flask and to the flask is then added deionized water, gluconic acid aqueous solution and aqueous sodium hydroxide. The composition in each instance in the flask is thus as follows:

TABLE I

| Starting System Components | Percent by Weight (100 Weight % Total Composition Basis) |
|---|---|
| Copper/Zinc Alloy | 11.07 |
| Deionized Water | 52.73 |
| Gluconic Acid (60% aqueous sol.) | 1.05 |
| Sodium Hydroxide (50% aqueous sol.) | 35.15 |

After the alloy, water, and gluconic acid are placed in the stirred flask (the stirring being sufficient to maintain the particles in a suspended condition), the system is purged with nitrogen to remove air. While a nitrogen blanket is maintained, and stirring is continued, the aqueous sodium hydroxide is added over a time interval of about 0.1-3 hrs. The total quantity of NaOH so added to the suspension in the reaction flask is thus about 3 to 4 times the number of moles of zinc initially present in such alloy. Concurrently the flask contents are heated to a specified temperature and heating is continued for a specified time. Then heating and stirring are discontinued, the aqueous sodium hydroxide containing residual solution is separated from the resulting remaining particles, and the product activated alloy is then washed with deionized water until a wash water pH ranging from about 6 to 8 is obtained. Thereafter, the resulting washed product particles are stored under deionized water until used.

The activation conditions (time and temperature) during the period of NaOH contacting, the starting alloy composition, and the particulate product activated catalyst material composition are shown, respectively, in Table II below:

TABLE II

| Ex. No. | Starting Alloy % Copper | Starting Alloy % Zinc | Activation Temp (OC) | Activation Time (HRS) | Product Composition % Copper (After Prep) | Product Composition % Zinc Removed |
|---|---|---|---|---|---|---|
| 1 | 20 | 80 | 45 | 50 | 20 | — |
| 2 | 30 | 70 | 45 | 50 | 68 | 80 |
| 3 | 30 | 70 | RoomT | 100 | 68 | 80 |
| 4 | 40 | 60 | 45 | 50 | 39 | — |
| 5 | 50 | 50 | 45 | 50 | 61 | 36 |
| 6 | 50 | 50 | 45 | 100 | — | — |
| 7 | 70 | 30 | 45 | 50 | 70 | — |

EXAMPLES 8-41

Catalytic Hydrolysis of Acrylonitrile to Acrylamide

Each of the activated copper compositions produced in Examples 1-7 above is separately utilized in a procedure for hydrolyzing acrylonitrile to acrylamide, the respective product of Examples 1-7 being employed as a suspension catalyst in such hydrolysis procedure.

the reactant system in each instance was as follows:

TABLE III

| System Components | Grams Added | % By Weight of Reactant 100% Total System Basis |
|---|---|---|
| Acrylonitrile | 220 | 37.88 |
| Deionized Water | 325 | 55.93 |
| Aqueous Sol. of 4 grams, sodium lauryl sulfate; 1 gram, sodium nitrate, and 10 milliliters, deionized water | 1 | 0.17 |
| Catalyst Particles | 35 | 6.02 |
| TOTAL | 581 | 100 |

In this system, the total percent of catalyst based on acrylonitrile is 15.9. All reactants in the system, as above-identified are placed in an autoclave, after which such vessel is nitrogen purged and sealed. The mixture in the autoclave is then stirred for six hours while maintaining a temperature in the autoclave from about 100° to 105° C. After cooling to room temperature, the autoclave contents are removed and filtered to separate product liquids from residual solids. The filtrate liquid is analyzed for residual acrylonitrile and total acrylamide.

The percent conversion of acrylonitrile to acrylamide thus achieved for each catalyst is shown in Table IV below:

TABLE IV

| Example No. | Catalyst Produced in Example No. | % Conversion of Acrylonitrile Acrylonitrile |
|---|---|---|
| 8 | 1 | 1.5 |
| 9 | 2 | 58.4 |
| 10 | 3 | 58.4 |
| 11 | 4 | 1.3 |
| 12 | 5 | 1.1 |
| 13 | 6 | 1.1 |
| 14 | 7 | 10.2 |

From Table IV it is seen that only copper/zinc alloys comprised of 30% copper and 70% zinc were activatable into catalysts usable for the conversion acrylonitrile to acrylamide by the foregoing alkali metal hydroxide activation procedure.

EXAMPLES 15-22

Conditions of Activation

To determine the effect of activation conditions on catalytic activity of an activated copper/zinc alloy containing 30% copper and 70% zinc, such an alloy is prepared in the form of particles ranging from about 0.001 to 0.5 inch in average diameter. Using such alloy particles, a series of activations is carried out using the following procedure.

A measured quantity of such alloy particles is introduced into a stirable flask and to the flask is then added deionized water and the activator, as in the procedure of Examples 1-7. The composition here in each instance in the flask is as follows:

TABLE V

| Reactant | % by Weight (100 weight % total basis) |
|---|---|
| Copper/Zinc Alloy | 11.07 |
| Deionized Water | 52.73 |
| Gluconic Acid (60% sol.) | 1.05 |
| Activator Solution | 35.15 |

After the alloy and the water are placed in the stirred flask, the system is first purged with nitrogen to remove air, and then the activator is added while stirring and purging are continued. The flask contents are then heated to a specified temperature for a specified time. The resulting activated product alloy is then washed with deionized water until a wash water pH ranging from about 6 to 8 is obtained. Thereafter, the resulting washed product is stored under deionized water until used.

The conditions, activator identity, and product activated material are shown, in each instance, in Table VI:

TABLE VI

| Ex. No. | Activation Temp. °C. | Time HRS | Activator Solution (Aqueous) | Product Composition % Copper (after prep.) |
|---|---|---|---|---|
| 15 | 107 | 6 | 25% H$_2$SO$_4$ | 52 |
| 16 | 45 | 28.5 | 20% NaOH | 70 |
| 17 | 45 | 50 | 20% NaOH | 68 |
| 18 | 15 | 100 | 20% NaOH | 83 |
| 19 | Room T | 100 | 20% NaOH | 68 |
| 20 | Room T | 200 | 20% NaOH | 80 |
| 21 | 45 | 200 | 20% NaOH | 78 |
| 22 | 45 | 100 | 20% NaOH* | — |

*Alloy prerinsed with 10% hydrochloric acid before NaOH activation (contacting) commenced.

EXAMPLES 23-30

Using the acrylonitrile hydrolysis procedure described above in relation to Examples 8-14, each of the catalysts produced in Examples 15-22 is evaluated to determine percent conversion of acrylonitrile to acrylamide. The results are shown in Table VII:

TABLE VII

| Ex. No. | Catalyst Produced in Example No. | % Conversion to Acrylamide |
|---|---|---|
| 23 | 15 | 6.4 |
| 24 | 16 | 21.6 |
| 25 | 17 | 58.0 |
| 26 | 18 | 50.0 |
| 27 | 19 | 63.0 |

TABLE VII-continued

| Ex. No. | Catalyst Produced in Example No. | % Conversion to Acrylamide |
|---|---|---|
| 28 | 20 | 55.8 |
| 29 | 21 | 54.1 |
| 30 | 22 | 54.7 |

Because of the poor conversion to acrylamide achieved by using a catalyst activated with sulfuric acid (see Example 15), it is concluded that acid activation is not desirable for use in preparing a copper/zinc activated catalyst from a starting material of 30% copper and 70% zinc (100 weight % basis). Prerinsing with acid before contacting with alkali metal hydroxide does not appear to enhance catalytic activity (see Example 22). A total activation contact time of at least about 50 hours appears to be desirable (preferred).

EXAMPLE 31

Activation of Alloy to Copper Catalyst

A copper/zinc alloy comprised of 30% copper and 70% zinc (100 weight % alloy basis) in the form of particles ranging from about 0.001 to 0.5 inch in average diameter is processed by the procedure above described in relation to Examples 1-7, except that no gluconic acid is utilized.

EXAMPLE 32

Catalytic Hydrolysis of Acrylonitrile to Acrylamide

The activated product particles of Example 31 are used to hydrolyze acrylonitrile to acrylamide by the procedure described above in relation to Examples 8-14. The percent conversion of acrylonitrile achieved is somewhat less than that obtained when using under the same conditions the catalyst of Examples 2 and 3, but the activated product of Example 31 is still regarded as a useful catalyst for hydrolyzing acrylonitrile to acrylamide.

It is in general easier to form copper zinc alloy into particles having diameters ranging from about 0.002 to 0.5 inch than it is to form such an alloy into particle having diameter in the range of from about 0.02 to 0.50 inch. Therefore it is preferred to use a catalyst of the present invention for suspension bed purposes.

EXAMPLE 33

Activation of Alloy to Copper Catalyst

About 220 grams of a copper zinc alloy comprised of 30% copper and 70% zinc (100 weight percent alloy basis) in the form of particles ranging from about 0.001 to 0.5 inch in average diameter is introduced into a stirred flask which already contains about 3500 grams of aqueous solution of NaOH wherein sufficient NaOH has previously been dissolved to produce a 20 weight percent solution of NaOH. The total quantity of NaOH so contacted with the alloy particles is thus about 3.7 times the number of moles of zinc initially present in such alloy. Stirring is continued for about 100 hours after which the resulting particles are separated, washed with deionized water, until a wash water pH of 6 to 7 is achieved, and then stored under dionized water until used. It is found that at least about 50 weight percent of the zinc initially present is removed by such activation procedure.

EXAMPLE 34

Hydrolysis

The activated product particles of Example 33 are used to hydrolyze acrylonitrile to acrylamide by the procedure described above in relation to Examples 8–14. The percent conversion of acrylonitrile achieved is somewhat less than that obtained in Example 32, but the activated product of Example 33 is still regarded as a useful catalyst for hydrolyzing acrylonitrile to acrylamide.

We claim:

1. A process for preparing a catalyst suitable for catalytically hydrolyzing acrylonitrile to acrylamide comprising contacting aqueous alkali metal hydroxide with an alloy comprised on a 100 weight percent total alloy weight basis of about 30 weight percent copper and about 70 weight percent zinc which is in the form of particles having a size ranging from about 0.0005 to 0.5 inches in average diameter for a time sufficient to remove from said alloy at least about 50 weight percent of the zinc initially present therein thereby to produce such catalyst.

2. The process of claim 1 wherein, during said contacting, the total amount of alkali metal hydroxide present ranges from bout 1.0 to 4.0 times the number of moles of zinc initially present in said alloy and said alloy particles are suspended in said aqueous alkali metal hydroxide.

3. The process of claim 1 wherein said alkali metal hydroxide is sodium.

4. The process of claim 1 wherein during said contacting the temperature of said aqueous alkali metal hydroxide is maintained in the range from about 15° C. to reflux, and at least about 70 weight percent of said zinc initially present in said alloy on a 100 weight percent total alloy basis is removed.

5. The process of claim 1 wherein after said contacting said catalyst is washed with water until a wash water pH at least not above about 8 is achieved.

6. The process of claim 5 wherein the resulting so washed catalyst is stored under water until used.

7. The process of claim 1 wherein, before said contacting is commenced said alloy is suspended in water, and said alkali metal hydroxide is added to such suspension gradually over a time period which is not greater than the total time of said contacting.

8. The process of claim 1 wherein said alloy is suspended in water initially and the initial weight ratio of said alloy to said water ranges from about 0.001 to 0.35.

9. The process of claim 1 wherein said contacting is conducted in the presence of at least one dissolved compound selected from the group consisting of polyhydroxylated compounds with at least two carbon atoms and at least two hydroxyl groups per molecule.

10. The process of claim 1 wherein said contacting is conducted under an oxygen-free atmosphere.

11. A process for preparing a catalyst suitable for catalytically hydrolyzing acrylonitrile to acrylamide comprising the steps of:

(A) suspending in water with agitation in a reaction zone an alloy comprising on a 100 weight percent total alloy basis about 30 weight percent copper and about 70 weight percent zinc, said alloy being in the form particles having a size ranging from about 0.0005 to 0.03 inch in average diameter to produce an initial weight ratio of said alloy particles to said water in the range from about 0.01 to 0.35, (B) adding alkali metal hydroxide to such so suspended alloy particles while maintaining the bulk temperature of said water in the range from about 15° C. to reflux, thereby to contact said particles with said alkali metal hydroxide under liquid phase conditions, the total quantity of alkali metal hydroxide so added to such suspension ranging from about 1.0 to 4.0 times the number of moles of zinc initially present in said alloy, the time of such adding ranging from about 10 to 200 hours and the total time of such contacting ranging from about 10 to 200 hours, the interrelationship between said temperature and said total contacting time being such that at least about 50 weight percent of the zinc initially present in said alloy is removed therefrom on a 100 weight percent total alloy basis, (C) terminating said agitation in said reaction zone, and separating said water with said alkali metal hydroxide contained therein from said product particles, and (D) washing with water said catalyst particles until a wash water pH not above about 8.0 is achieved.

12. The process of claim 11 wherein said alkali metal hydroxide is sodium.

13. The process of claim 11 wherein the total concentration of dissolved said alkali metal hydroxide present during said adding and said contacting in such suspension is not greater than about 50 weight percent based upon total weight of water plus dissolved alkali metal hydroxide.

14. The process of claim 11 wherein said adding and said contacting is conducted in the presence of at least one dissolved compound selected from the group consisting of polyhydroxylated carboxylic acid compounds, aliphatic polyhydroxylated compounds with at least two carbon atoms and at least two hydroxy groups per molecule.

15. The process of claim 1 wherein said adding and said contacting are conducted under an oxygen-free atmosphere.

16. The process of claim 15 wherein, after said adding is completed, the resulting aqueous solution of alkali metal hydroxide is maintained in contact with said particles while so suspended until at least about 70 weight percent of said zinc initially present in said alloy on a 100 weight percent total initial alloy basis is removed.

17. A catalyst produced by the process of claim 1.

18. A catalyst produced by the process of claim 16.

19. The process of claim 11 wherein said step (B) said bulk temperature ranges to about 55° C.

20. The process of claim 11 wherein in said step (D) said pH is not above about 7.5.

21. The process of claim 11 wherein said total contacting time is at least about 50 hours.

22. A process for catalytically hydrolyzing acrylonitrile to acrylamide comprising reacting under liquid phase conditions an aqueous mixture of acrylonitrile and water with a copper catalyst at a temperature of from about 65° to 150° C., said copper catalyst having been produced by contacting an alloy comprised on a 100 weight percent basis of about 30 weight percent copper and about 70 weight percent zinc which is in the form of particles having a size ranging from about 0.0005 to 0.5 inches in average diameter with aqueous alkali metal hydroxide for a time sufficient to remove from said alloy at least about 50 weight percent of the zinc initially present therein.

23. The process of claim 22 wherein said alkali metal hydroxide is sodium.

24. The process of claim 22 wherein during said contacting, the total amount of alkali metal hydroxide present ranges from about 1.0 to 3.0 times the number of moles of zinc initially present in said alloy and said alloy particles are suspended in said aqueous alkali metal hydroxide.

25. The process of claim 22 wherein during said contacting the temperature of said aqueous alkali metal hydroxide is maintained in the range from about 15° C. to reflux and at least about 70 weight percent of said zinc initially present in said alloy on a 100 weight percent total alloy basis is removed.

26. The process of claim 22 wherein after said contacting said catalyst is washed with water until a wash water pH not above about 7.5 is achieved.

27. The process of claim 22 wherein the resulting so washed catalyst is stored under water until used.

28. The process of claim 22 wherein before said contacting is commenced said alloy is suspended in water, and said alkali metal hydroxide is added to such suspension gradually over a time period which is not greater than the total time of said contacting.

29. The process of claim 22 wherein the initial weight ratio of said alloy to said water ranges from about 0.01 to 0.35.

30. The process of claim 22 wherein said contacting is conducted in the presence of at least one dissolved compound selected from the group consisting of polyhydroxylated carboxylic acid compounds, aliphatic polyhydroxylated compounds with at least two carbon atoms and at least two hydroxyl groups per molecule.

31. The process of claim 23 wherein said contacting is conducted under an oxygen-free atmosphere.

32. A process for catalytically hydrolyzing acrylonitrile to acrylamide comprising reacting an aqueous mixture of acrylonitrile and water with a copper catalyst at a temperature of from about 65° to 150° C., said copper catalyst having been prepared by the process of claim 11.

33. A process for catalytically hydrolyzing acrylonitrile to acrylamide comprising the steps of sequentially:

(A) suspending in water contained in a reaction zone with agitation copper catalyst particles prepared by the process of claim 1 and having a particle size ranging from about 0.005 to 0.03 inches in average diameter, the weight ratio of said water to said catalyst ranging from about 2.0 to 20.0, (B) adding to said water while said catalyst particles are so suspended therein and while maintaining at an initial water temperature ranging from about 80° to 150° C. acrylonitrile with agitation, the total amount of acrylonitrile so added being such that the weight ratio of said water to total added acrylonitrile ranges from about 93.5:6.5 to 25:75, (C) maintaining the resulting mixture in said reaction zone with agitation at a water temperature ranging from about 80° to 150° C. until a total conversion of said acrylonitrile to produced acrylamide of at least about 50% is achieved, (D) terminating said agitation in said reaction zone, thereby causing said catalyst particles to fall to the bottom of said reaction zone, (E) removing at least a major portion of said acrylamide product solution from said reaction zone while retaining substantially all of said catalyst particles in said reaction zone, (F) charging water to said reaction zone in an amount sufficient to bring the weight ratio of said water to said catalyst into the range from about 2.0 to 20.0, and (G) repeating sequentially said steps (A) through (F) at least once.

34. The process of claim 33 wherein said water temperature ranges from about 85° to 115° C.

35. The process of claim 33 wherein said maintaining is continued until the total conversion of said acrylonitrile to produced acrylamide is at least about 65%.

36. In a process wherein acrylonitrile is hydrolyzed in the presence of a copper catalyst, the improvement which comprises using as said catalyst a particulate copper catalyst which has been prepared by contacting alloy particles comprised on a 100 weight percent total basis of about 30 weight percent copper and about 70 weight percent zinc, with aqueous alkali metal hydroxide.

37. The process of claim 36 wherein said alloy particles initially have average particle diameters in the range of from about 0.005 to 0.03 inch.

* * * * *